United States Patent [19]

Ratza et al.

[11] Patent Number: 5,658,047
[45] Date of Patent: Aug. 19, 1997

[54] FOLDING SEAT

[75] Inventors: Clifton J. Ratza, Grand Rapids; Roger J. Quinlan, Kentwood; James J. Betcher, Shelbyville, all of Mich.

[73] Assignee: Attwood Corporation, Lowell, Mich.

[21] Appl. No.: 461,388

[22] Filed: Jun. 5, 1995

[51] Int. Cl.⁶ .................................................. B60N 2/24
[52] U.S. Cl. ........................... 297/378.14; 297/378.1; 297/188.04; 297/125; 297/452.46; 297/452.14
[58] Field of Search ........................... 297/378.1, 378.14, 297/378.12, 188.04, 125, 452.46, 452.38, 452.14, 357

[56] References Cited

U.S. PATENT DOCUMENTS

| | | |
|---|---|---|
| D. 183,233 | 7/1958 | Ahrens . |
| D. 227,833 | 7/1973 | Olson . |
| D. 303,878 | 10/1989 | Goldsmith . |
| D. 312,004 | 11/1990 | Smith et al. . |
| D. 330,639 | 11/1992 | Munro et al. . |
| D. 333,737 | 3/1993 | Adams . |
| D. 339,695 | 9/1993 | Kahl et al. . |
| 4,105,245 | 8/1978 | Simons et al. . |
| 4,521,052 | 6/1985 | Cone . |
| 4,775,187 | 10/1988 | Herr . |
| 4,871,209 | 10/1989 | Handelman . |
| 4,881,776 | 11/1989 | Wang . |
| 4,902,070 | 2/1990 | Casale et al. . |
| 4,989,915 | 2/1991 | Hansal . |
| 5,018,788 | 5/1991 | Cedergreen . |
| 5,415,458 | 5/1995 | Kim ................................. 297/378.14 |
| 5,489,141 | 2/1996 | Strausbaugh et al. ......... 297/378.14 X |
| 5,492,389 | 2/1996 | McClintock et al. ........... 297/378.14 X |
| 5,501,501 | 3/1996 | White et al. ..................... 297/378.12 X |

FOREIGN PATENT DOCUMENTS 56-86830  7/1981  Japan .

OTHER PUBLICATIONS

Tempress®, Innovative Marine Products Catalog (1992), Seattle, Washington.
Wise Catalog, Rector, Arizona Sep. 1992.
Garelick EEZ®–In, Full Line Marine Products Catalog (1993), St. Paul Park, Minnesota.

*Primary Examiner*—Peter M. Cuomo
*Assistant Examiner*—David E. Allred

[57] ABSTRACT

A foldable seat includes a seat member having a pair of generally upwardly opening elongate slots, and a backrest having a pair of hingeblades received with the slots. The hingeblades are pivotally connected to the seat member for rotation about a pivot axis. The hingeblades include bearing surfaces which engage stop surfaces located inside the slots on the seat member to prevent backward rotation of the backrest beyond the normal upright position. The pivot axis, bearing surfaces and stop surfaces are all located below the upper seating surface of the seat member and forward of the rear edge thereof, so that major pinch points are generally inaccessible, whereby the risk of injury on account of inadvertent placement of a finger between the bearing surfaces of the hingeblades and the stop surfaces of the seat member are substantially eliminated. A lockbar for holding the backrest in a folded position is included, along with various upholstery options and a backrest cover allowing use of the backrest as a work surface when in folded position.

28 Claims, 7 Drawing Sheets

5,658,047

FOLDING SEAT

BACKGROUND OF THE INVENTION

This invention relates to a foldable seat having a backrest which is pivotally secured to a seat member to permit displacement of the backrest between a folded, substantially horizontal position and an unfolded, upright position. More particularly, the invention pertains to such seats which are adapted to be mounted to, and used, in a boat.

Boats, such as bass fishing boats, are often provided with a seat having a backrest which can be folded downwardly to reduce stress and strain on the seat and to reduce wind resistance when the boat is being towed on a trailer. It can also be desirable to have a seat with a backrest which can be folded down to reduce visual obstruction when the boat is being propelled over the water.

Known foldable seats have generally utilized separate metal hinges which are attached to the backrest and seat member. These known seats with separate metal hinges have many disadvantages which include the time and labor associated with securing the hinges to the backrest and seat member. Another major disadvantage with such seats, is that the metal hinges generally include large exposed pinch points which can easily cause inadvertent injury to the unwary.

Other known foldable seats have employed lugs on the backrest which are hingedly secured to ears on the back of the seat member. These hinge arrangements have relied upon large exposed stop surfaces on the rear of the seat member which are engaged by bearing surfaces on the backrest. Consequently, such seats present a substantial risk of injury to people who may inadvertently place a finger between the exposed bearing surfaces and stops.

An example of a popular foldable seat having major exposed pinch points which could cause injury is shown in U.S. Pat. No. 5,018,788 assigned to Tempress Incorporated, which has an exposed bottom rib on the back member which bears against the top of an exposed rib on the seat member. In addition to presenting highly exposed pinch points, the foldable seat shown in U.S. Pat. No. 5,018,788, like many other known foldable seats, has a hinge failure mode wherein if the hinge pin fails for any reason, the back member will not be significantly restrained from rotating backwardly, which again can cause pain or injury to a person leaning backwardly against the back member if the hinge fails.

Known foldable seats are also often difficult to upholster, uncomfortable on account of flat seating and backrest surfaces, and the rear surface of the backrest of most known foldable seats cannot be used as a substantially flat work surface.

Another disadvantage with known foldable chairs is that the backrest is usually held in the folded position by a cloth strap having a snap-type fastener. These straps can become frayed and often fail in the vicinity of the snap. Also, positive engagement of the snap fastener can be difficult and is not always easily detected.

Accordingly, there is a need for a foldable chair having concealed hinges and stops wherein exposure to pinch points which can cause injury is significantly reduced, and wherein the stops are designed so that the backrest will be retained in the normal upright position if the hinge pins or material surrounding the hinge pins fail when a person is leaning backwardly against the backrest. Additionally, it would be desirable if the seat were provided with a durable reliable, easy to use locking device which retains the backrest in the folded position such as when the seat is mounted on a boat which is being towed on a trailer.

SUMMARY OF THE INVENTION

The invention provides a foldable seat having concealed hinges and stops which prevent the backrest from tilting backwardly beyond the normal upright position, while significantly reducing the potential risk of injury which could otherwise occur on account of inadvertent placement of a finger on a stop surface when the backrest is unfolded into the upright position. The seat is also provided with a plurality of concealed stop surfaces which will prevent the backrest from tilting backwardly beyond the normal upright position in the event of a failure of the hinge pin or material surrounding the hinge pin. Additionally, the stop surfaces will tend to reduce stresses and strains on the hinge pin and the surrounding hinge area during normal use, thereby providing better reliability and extended use of the seat.

In accordance with one aspect of the invention, the seat includes a seat member having an upper seating surface with a pair of generally upwardly opening elongated slots which are located adjacent to lateral edges near the rearward corners of the seating surface, and a backrest having a pair of hingeblades which are each received in one of the slots. The hingeblades are pivotally connected to the seat member for rotation about a pivot axis which is located below the seating surface and forward of the rear edge of the seat member, so that the hinge area is relatively inaccessible to significantly reduce the risk of inadvertent injury caused by placement of a finger in the hinge area.

Another feature of the invention which contributes to the relative safety thereof, as compared with known foldable seats, is the placement of stop surfaces, to prevent backward rotation of the backrest beyond the normal upright position; within an enclosed space below the seating surface and forward of the rear edge end of the seat member. Such concealed placement of the stops substantially eliminates the risk of a person's tinkers becoming pinched between the stops on the seat member and surfaces on the backrest which bear against the stops when the backrest is in the upright position.

Another preferred feature of the invention involves sizing the hingeblades so that they occupy substantially all of the space between the edges of the slots when the backrest is unfolded into the upright position so that it becomes generally impossible to insert a finger into one of the slots when the backrest is being raised to the upright position.

The slots are desirably relatively narrow so that most people cannot inadvertently, or even intentionally, stick their finger into the slots, regardless of whether the backrest is in the upright position, folded position, or anywhere in between.

In accordance with another aspect of the invention, the seat member is provided with a plurality of stop surfaces which are engaged by bearing surfaces on the backrest to prevent backward rotation of the backrest beyond the normal upright position, even in the event of a failure of the hinge pin or material surrounding the hinge pin. This stop arrangement also relieves stresses and strains on the pivot pins and areas of the backrest and seat member upon which the pivot pins bear during normal use, whereby the seat can achieve a longer service life before a hinge failure occurs.

A further aspect of the invention provides a locking device which is easily used to positively and reliably engage the backrest to retain the same in the folded position. The locking device includes a lockbar which is pivotally attached to the seat member for rotation between an unlocked position wherein the hingeblade can pivot freely within the slots, and a locked position wherein the lockbar spans across one of the slots to block rotation of the hingeblade to prevent displacement thereof from the folded position.

The invention also includes various features which enhance the comfort, utility, and overall enjoyability of the folding seat. Such features include ergonomically contoured seat and backrest surfaces which provide greater comfort than known foldable seats, and a panel on the rear side of the backrest which greatly improves the appearance of the seat and which can be used as a substantially horizontal work surface when the backrest is folded downwardly. Additionally, the seat is specially designed so that it can be easily upholstered or cushioned using a variety of appealing techniques.

These and other features, objects, and benefits of the invention will be recognized by those who practice the invention and by those skilled in the art, from the specification, the claims, and the drawing figures.

DESCRIPTION OF THE PREFERRED EMBODIMENTS

Figure 1:
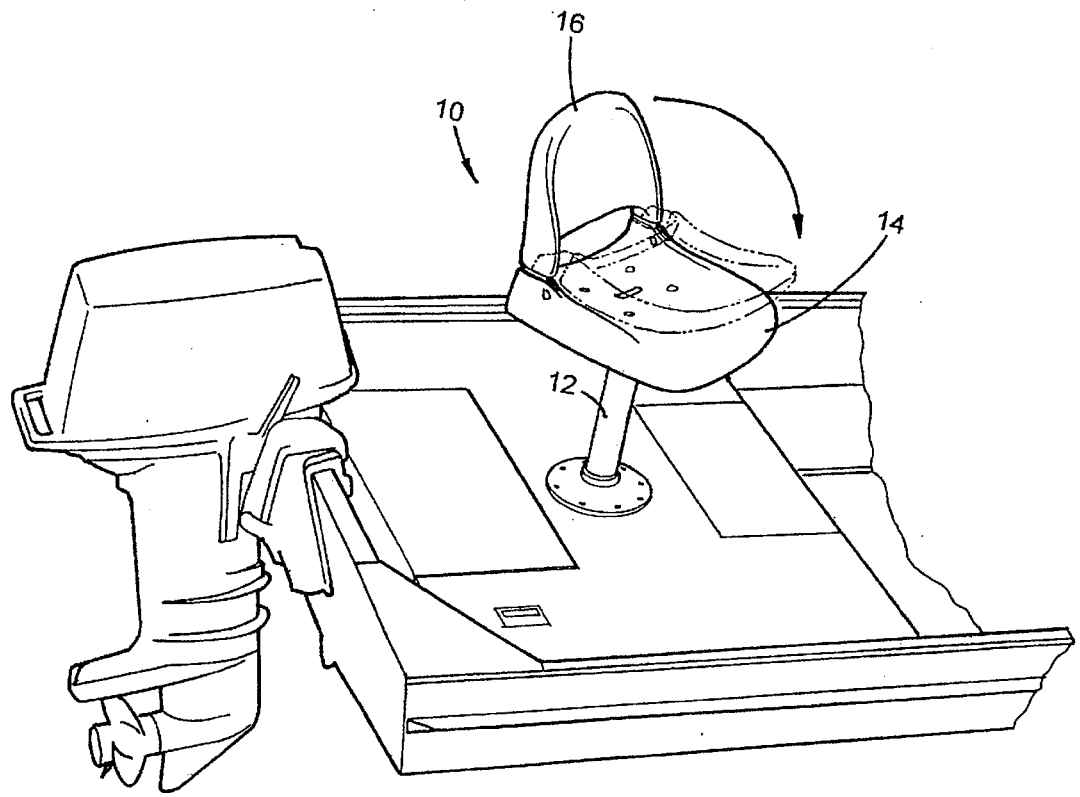
FIG. 1 is a perspective view of a pinch resistant foldable seat in accordance with the invention, which is mounted onto a pedestal secured to the deck of a boat, showing in solid outline the backrest folded upwardly, and also showing the backrest folded downwardly in phantom outline.

With reference to FIG. 1, there is shown a foldable seat 10 mounted onto a pedestal 12 secured at its base to the deck of a boat. The seat 10 includes a seat member 14 and a backrest 16 which is hingeably attached to the seat member for displacement between an upright unfolded position (shown in solid outline in FIGS. 1 and 3) and a substantially horizontal folded position (shown in phantom outline in FIGS. 1 and 3).

The seat member 14 has an upper ergonomically contoured seating surface 18 to provide comfort in a variety of positions including a normal upright sitting position, a forward leaning position such as when the seat occupant is rigging tackle, or a backward leaning position such as when the seat occupant is casting a fishing line. The upper peripheral edges of the seat member are rounded downwardly toward a depending perimeter skirt to provide comfort even when the seat occupant is sitting on or with his or her legs extending across the edges of the seat and to eliminate pressure points on the legs when the seat occupant is seated in a normal position.

Figure 2:
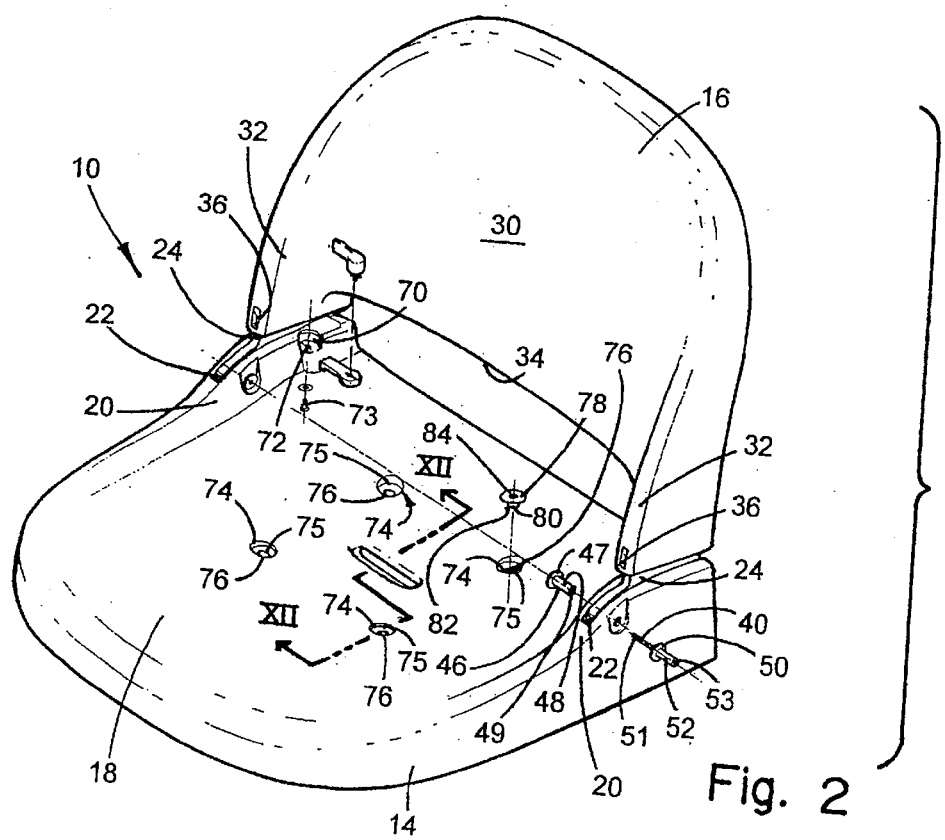
FIG. 2 is a partially exploded, front perspective view showing the various components comprising the pinch resistant foldable seat.
Figure 6:
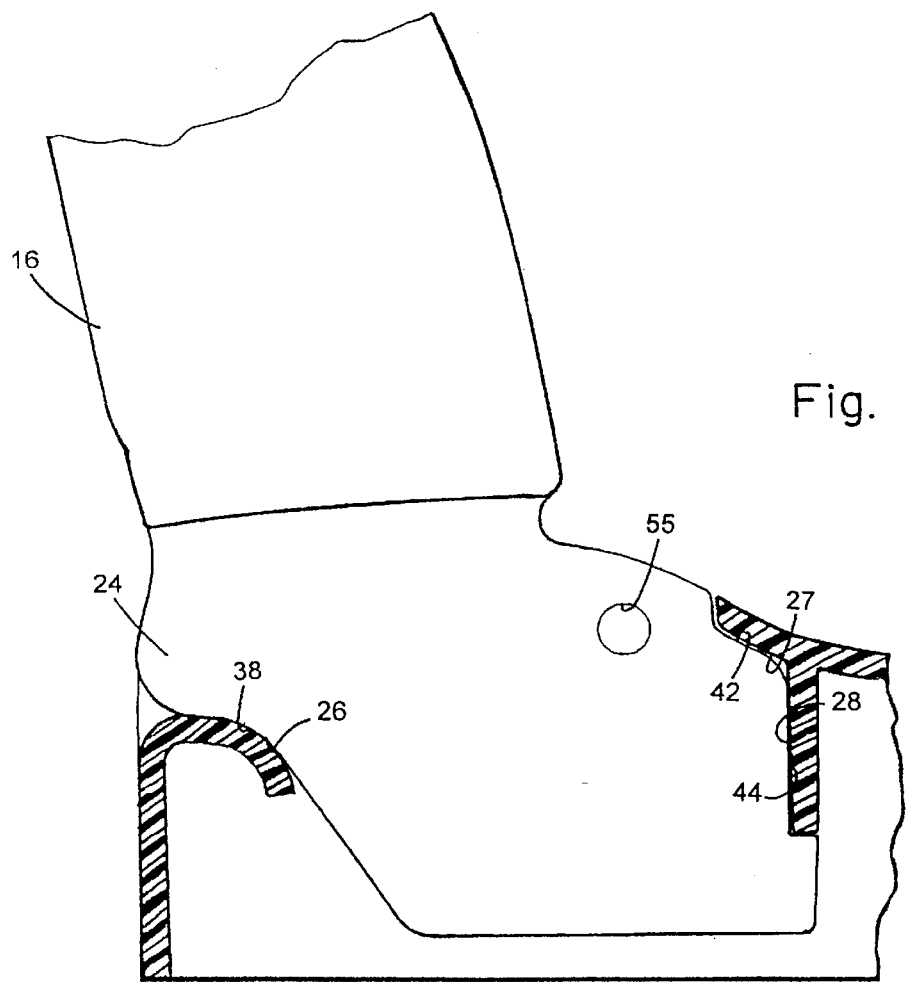
FIG. 6 is a partial side elevational view of the foldable seat with portions broken away showing the backrest supported at the hinge area on the seat member of the foldable seat.

Seat member 14 also includes sidewings 20 which project upwardly from opposite lateral edges near the rearward corners of the seating surface 18. The sidewings are generally hollow and each includes a narrow, generally upwardly opening or elongated slot 22 for receiving a hingeblade 24 which extends downwardly from the backrest 16 when the backrest is in the upright unfolded position. Depending downwardly from opposite elongate edges of each slot 22 are a pair of vertical, parallel walls 25 which provide lateral support for the hingeblades 24. The sidewings 20 each enclose hingeblades 24 and stops 26, 27, 28 (FIG. 6) which prevent backrest 16 from pivoting backwardly beyond the normal upright position when a person seated in the foldable seat 10 leans back against the backrest. The slots 22 are only slightly wider than the thickness of the hingeblades 24 so that a person, even an infant, is generally unable to insert their finger between the edges of the slot and the hingeblade. When the backrest 16 is in the upright position (as shown in FIG. 2) the hingeblade 24 occupies substantially all of the space between the edges of the slot 22 making it generally impossible to inadvertently, or even intentionally, insert a finger through the slot into the hollow space within the sidewing 20. As the backrest 16 is folded downwardly into the substantially horizontal folded position, the hollow space within the sidewing 20 continues to remain generally inaccessible by virtue of the narrowness of slot 22. More specifically, the width of the slot 22 is about a ⅜ inch (about 1 cm) or less, so that it is generally impossible for most people to inadvertently, or even purposely, insert their finger into the slot as the backrest 16 is pivoted from one position to another. By positioning the hinges and stops 26, 27, 28 within an enclosed space which is substantially inaccessible, or at least highly resistant to inadvertent access, the risk of injury from getting fingers caught in a pinch point is significantly less than with conventional foldable seats having exposed hinges and stops. Sidewings 20 also provide lateral support to a seat occupant. Such lateral support can be useful and comforting to a person seated in a boat which is being maneuvered or which is rocking in the water.

The backrest 16 includes a back support surface 30 which is ergonomically contoured to provide comfort and lumbar support which takes pressure off the hips. The backrest 16 also includes sidewings 32 which project forwardly (when the backrest is in the upright unfolded position) from opposite lateral edges and gradually widen near the lower portion of the backrest. The sidewing 32 provides a relatively large, sturdy base from which hingeblade 24 can extend downwardly into slot 22 of seat member 14. Sidewings 32 also provide a seat occupant lateral support, which can be beneficial when the seat is used on a boat which is being maneuvered or which is rocking in the water. The backrest 16 also includes an inverted U-shaped cutout 34 which provides ventilation for additional comfort to a person seated on foldable seat 10. Sidewing 32 is generally hollow which reduces the mount of material needed to form the backrest, and therefore reduces the cost and weight of the seat 10. The rearward portion of the backrest can be left open or can be closed off with a cover plate, if desired. A drain opening 36 is provided in each sidewing 32 to allow water to flow therefrom when backrest 16 (typically one which does not have a rear cover plate) is left in the substantially horizontal folded position.

The hingeblade 24 (FIG. 6) includes, on its rearward edge, a downwardly facing concave edge surface 38, which bears against an angled, partially upwardly facing, complimentary convex stop surface 26. Stop surface 26 has upward and forward support components which counter torque imposed upon the backrest 16 about the pivot pin 40 when a person leans back against the backrest. The vertical support provided by stop surface 26 reduces the load forces which are imposed upon the pivot pin 40. The hingeblade 24 also includes, on its forward edge, a bearing surface 42 which slopes downwardly and forwardly, and a substantially vertical bearing surface 44. Bearing surfaces 42 and 44 engage complimentary stops 27, 28, respectively, when the backrest 16 is folded to the upright position. Stops 27, 28 provide additional restraint to counter torque imposed upon the backrest 16 about the pivot pin 40 when a person leans back against the backrest. Unlike most conventional foldable seats which often only have downwardly, rearwardly facing stops, the invention utilizes a plurality of bearing surfaces 26, 27, 28 on the seat member 16, which have forwardly, rearwardly, upwardly, and downwardly facing surface components. The bearing surfaces 26, 27, 28 are capable of providing both vertical support for the backrest and restraint against rotation thereof when a person leans backwardly against the backrest, even when pivot pin 40 is removed. This means that the backrest 16 will not rotate backwardly past its normal upright position in the event of a hinge failure, but will instead remain in the normal upright position while a seated person is leaning backwardly on the backrest.

The stop surfaces 26, 27, 28 are integrally attached to, and more preferably integrally formed as part of, the seat member 14, and are positioned within a substantially enclosed space below the upper surface 18 of the seat member 14. In particular, the bearing surfaces 38, 42, 44 on the hingeblades 24 engage the stop surfaces 26, 27, 28 at positions located below the seating surface 18 and forward of the rear edge of the seat member 14, so that potential pinch points therebetween are substantially inaccessible to prevent inadvertent injury when the backrest 16 is unfolded to the upright position. More specifically, the stop surfaces are located within the hollow space in sidewing 20 below and generally immediately adjacent the upwardly opening slot 22. Hingeblade 24, has a thickness which is only slightly less than the width of slot 22, and a length which is about equal to the length of slot 22, so that the hingeblade 24 occupies the space between the edges of slot 22 to substantially enclose potential pinch points between stops 26, 27, 28 and bearing surfaces 38, 42, 44 to reduce or substantially eliminate the possibility of a person accidently being pinched between the stops and bearing surfaces. The stops 26, 27, 28 are resiliently deformable to reduce shock loading to a seat occupant while providing support.

More specifically, when the backrest 16 is subjected to shock loading tending to force the backrest past its normal upright position, bearing 38 is suddenly urged against stop 26 with an abnormally large force, bearing 42 is simultaneously urged against stop 27 with an abnormally large force, and bearing 44 is simultaneously urged against stop 28 with an abnormally large force. By making stops 26, 27 of a suitable thickness and shape, and from a suitable material, they are able to exhibit some flexibility and resilience which allows stop 26 to deflect rearwardly and stop 27 to deflect upwardly. Upon shock loading, energy is absorbed by the stops (during the shock loading) and gradually released (during rebound) so that shock on the seat occupant is reduced.

The hinge pins 40 can be of generally any suitable type ordinarily used to pivotally secure members together. The illustrated hinge pin 40 is comprised of a tubular component 46 having a head 47 secured to a cylindrical shank 48 having an axial bore 49, and a rivet component 50 having a rod-like projection 51, a head 52, and a head projection 53. To install pivot pin 40, the shank 48 of tubular component 46 is inserted through aligned apertures 5.4, 55, 56 in the inward sidewall of sidewing 20, hingeblade 24, and the outward sidewall of sidewing 20, respectively. Thereafter, projection 51 of rivet component 50 is inserted into the axial bore of tubular component 46 and opposing forces are applied to head 52 of component 46 and head projection 53 of component 50 to cause deformation of rod-like projection 51 and head portion 53 to secure the components 46 and 50 together to form a hinge pin 40 securely journalled within apertures 54, 55, 56. The hinge pins 40 are positioned within the hollow space inside the sidewings 20 below the seating surface 18 and forward of the rear edge of the seat member 14.

Figure 7:
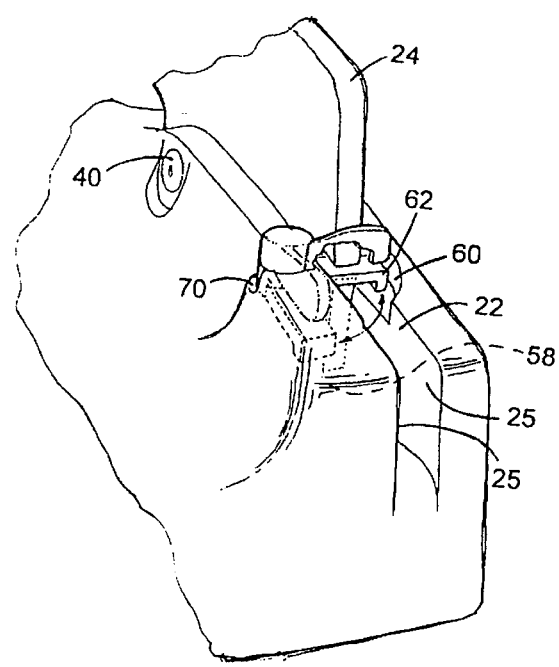
FIG. 7 is an enlarged, fragmentary, rear perspective view of the hinge area of the foldable seat showing a locking device rotated into a locked position which secures the backrest in its folded position, and which also shows in phantom outline the locking device rotated to the unlocked position.
Figure 9:
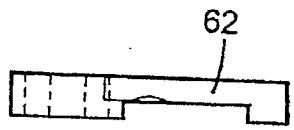
FIG. 9 is a side elevational view of the lower element of the locking device.
Figure 10:
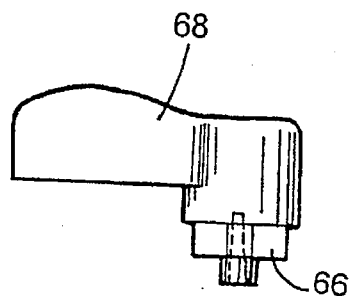
FIG. 10 is a side view of the upper element of the locking device.
Figure 8:
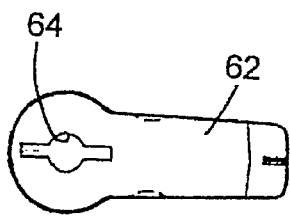
FIG. 8 is a bottom plan view of the lower element of the locking device.
Figure 11:
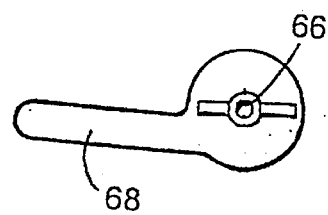
FIG. 11 is a bottom plan view of the upper element of the locking device.
Figure 12:
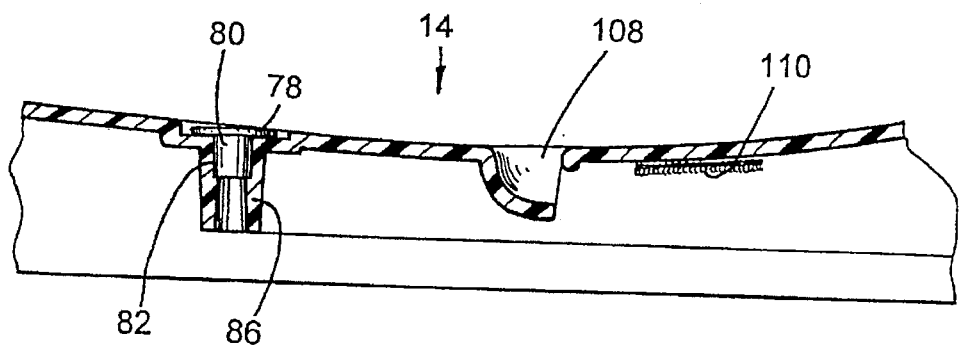
FIG. 12 is a sectional view of the foldable seat along lines XII—XII of FIG. 2.

Recesses 58 and 60 (FIG. 7) are formed on walls 25 at opposite sides of one of the upwardly opening slots 22 for receiving and allowing rotation of a lockbar 62 pivotally mounted to the seat member 14. The lockbar 62 is rotatable between an unlocked position (shown in phantom in FIG. 7) wherein the lockbar is positioned adjacent to the slot 22 and does not obstruct access to the hollow space below the slot, and a locked position (shown in solid in FIG. 7) wherein the lockbar spans across the slot to block rotation of the hingeblade to prevent displacement thereof from the folded position. Lockbar 62 (FIGS. 8 and 9) includes a keyway opening 64 for receiving a keyed projection 66 on a lock handle 68 (FIGS. 10 and 11). The handle 68 is positioned in a generally circular notched out area 70 on the upper seating surface 18. The notched out area 70 overlies the recess 58 in which lockbar 62 is received when rotated to the unlocked position. An aperture 72 is sized to allow the keyed projection 66 of handle 68 to pass through and be securely received within the keyway opening 64 of lockbar 62. Securement of the handle 68 is desirably achieved by a threaded fastener 73, although various alternative means such as an interference fit, adhesives or, other fasteners can be employed. Handle 68 can be rotated to move the lockbar between the locked and unlocked positions.

Figure 3:
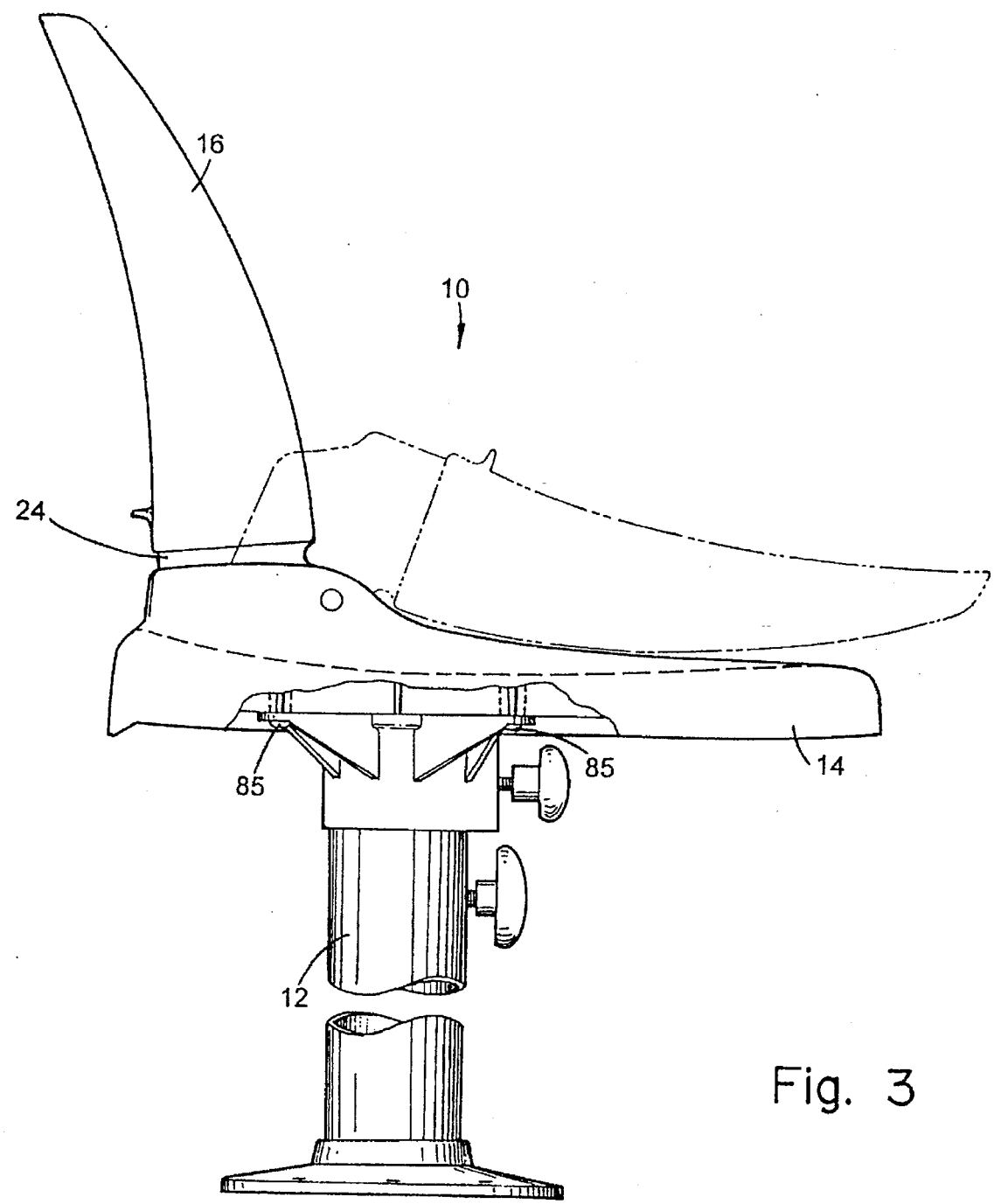
FIG. 3 is a side elevational view of the pinch resistant foldable seat showing in solid outline the backrest folded upwardly, and also showing in phantom outline the backrest folded downwardly, with portions broken away to show the folding seat mounted on a pedestal.

The upper seating surface 18 includes four recesses 74 arranged in a square pattern. The substantially horizontal surfaces 75 at the bottom of recesses 74 all lie in the same plane and each has an aperture 76 into which is secured a blind nut or T-nut 78. The T-nut has a plurality of spinal, propeller-like ridges 80 which project from the curved exterior walls of shank portion 82. The ridges have sharp edges which bite into the edgewalls of the apertures 76 to firmly secure the T-nut 78 therein when the T-nut is driven into the aperture with a generally downward twisting motion. Various other types of self-securing T-nuts can be used instead, such as those having knurls or barbs which can bite into the edgewalls of apertures 76. The T-nuts include a central axial bore 84 which is threaded to receive a bolt 85 (FIG. 3). The T-nuts 78 are arranged in a pattern which matches a standard bolt pattern used in a variety of commercially available pedestals 12 and other bracket-type devices for securing a seat to a deck or other base.

Figure 5:
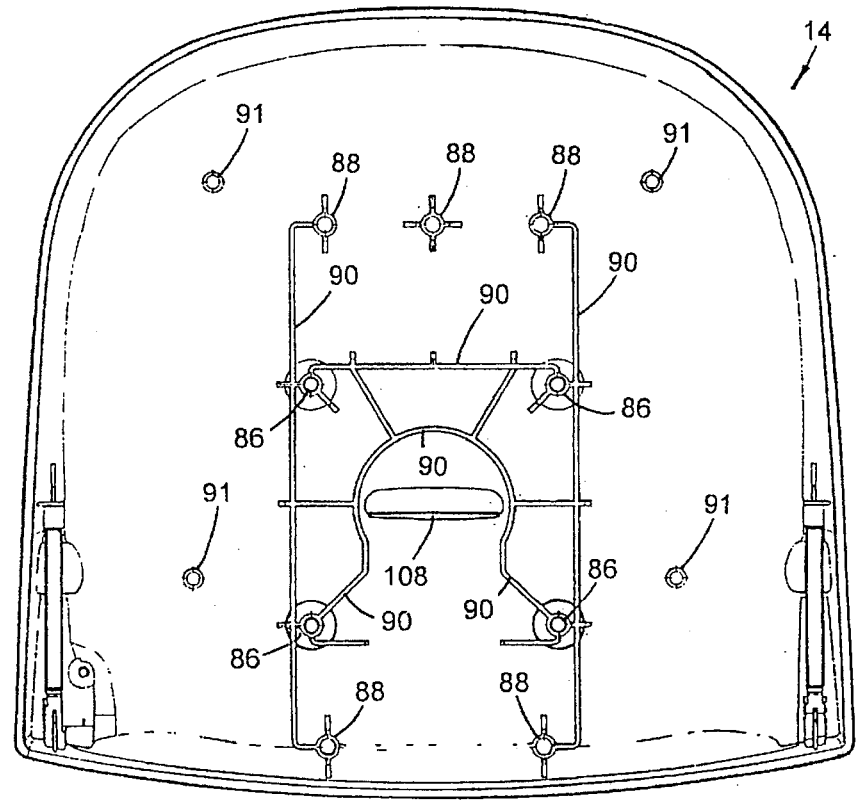
FIG. 5 a bottom view of the pinch resistant foldable seat.

With reference to FIG. 5, the seat member 14 has a plurality of circular bosses, including bosses 86 which serve as reinforcement for mounting the foldable seat 10 using the T-nuts 78, and bosses 88 which serve as reinforcements for mounting the seat 10 to a variety of standard slide-type brackets and the like. Also provided on the underside of seating surface 18 are a plurality of stiffening webs 90 which provide lateral reinforcement to the bosses 86, 88, and structural reinforcement and stiffness to the seat member 14. In order to mount the seat 10 to a bracket using the bosses 88, a hole is drilled or tapped out through the seating surface 18 above the central circular bore through bosses 88, and a fastener such as a bolt having a relatively low-profile rounded head can be passed through the hole and boss 88 from the upward side of the seat member 14.

Figure 4:
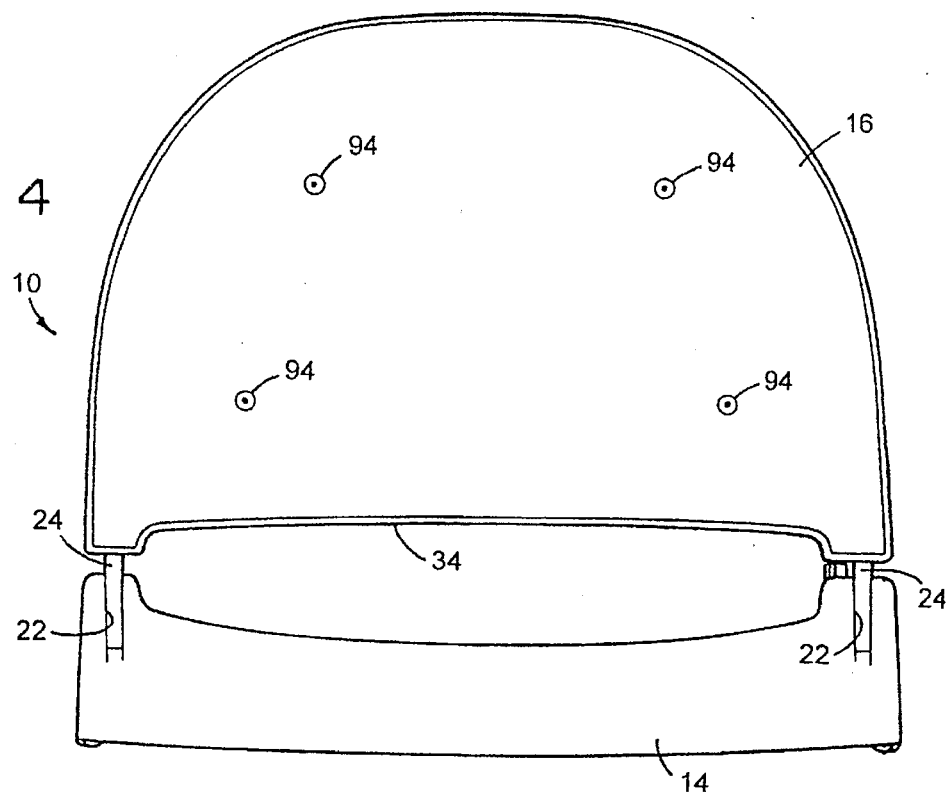
FIG. 4 is a rear elevational view of the pinch resistant foldable seat with the backrest unfolded in the upright position.
Figure 13:
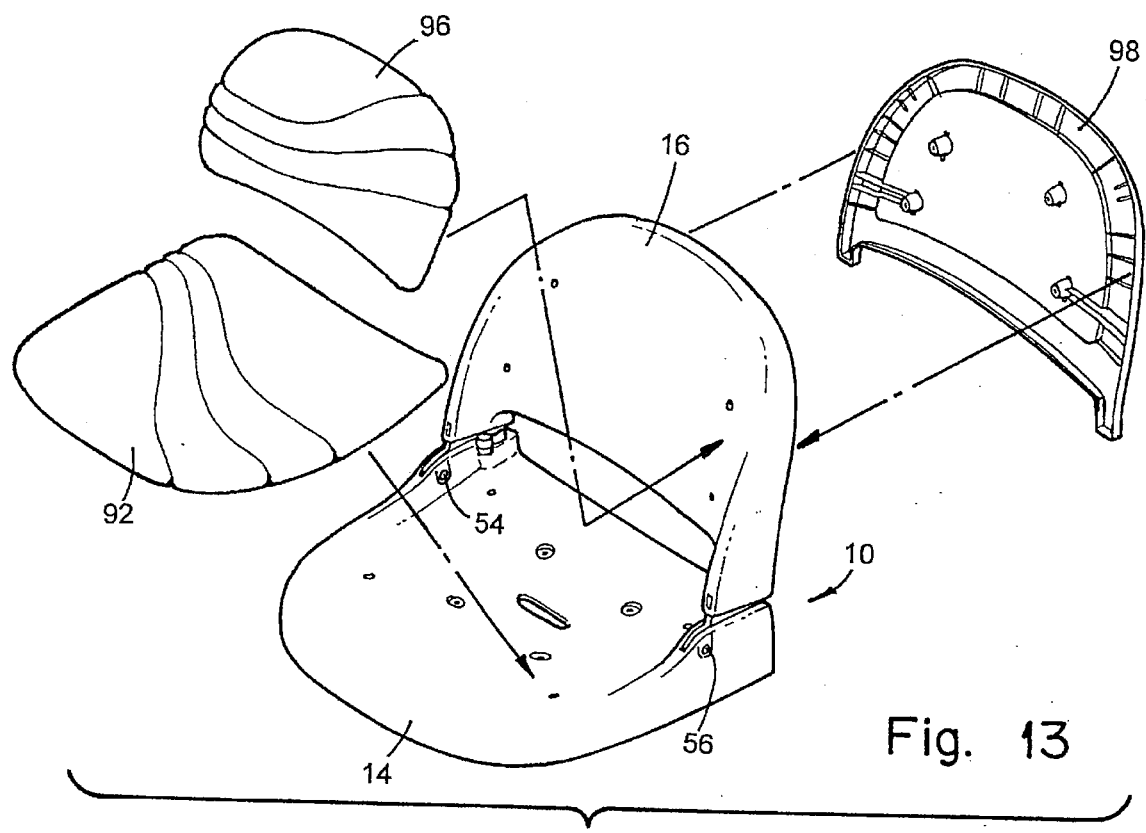
FIG. 13 is an exploded perspective view showing a back cushion, a seat cushion, and a seat backrest cover plate which are to be mounted to the foldable seat.
Figure 14:
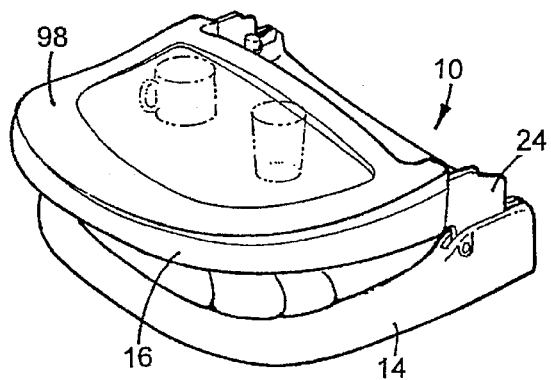
FIG. 14 is a perspective view of the pinch resistant foldable seat with the seat backrest fold folded down with the backrest cover plate attached thereto.

Also provided on the underside of seat member 14 are a plurality of tubular bosses 91 which can be used as fastener reinforcements for optionally attaching upholstered seat cushion 92 (FIG. 13) The rear of the backrest 16 includes a plurality of tubular bosses 94 (FIG. 4) which can be used as fastener reinforcements for attaching upholstered back cushion 96 and/or rear backrest cover plate 98 to the backrest, as shown in FIG. 13. As shown in FIG. 14, the cover plate 98 provides a substantially horizontal surface when the backrest 16 is folded downwardly into the substantially horizontal position. Such horizontal surface of the cover plate 98 can be used as a work surface or the like.

Figure 15:
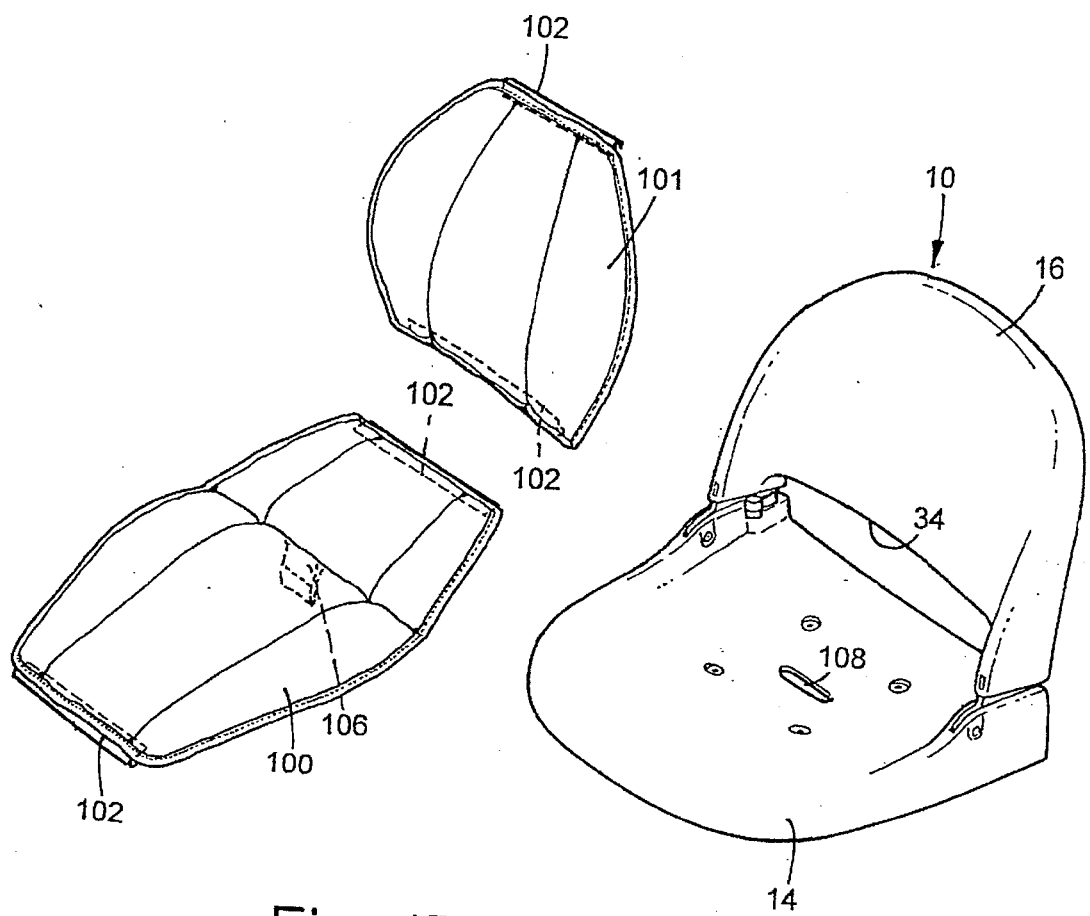
FIG. 15 is an exploded perspective view showing clip-on seat and back cushions which are to be attached to the foldable seat.
Figure 16:
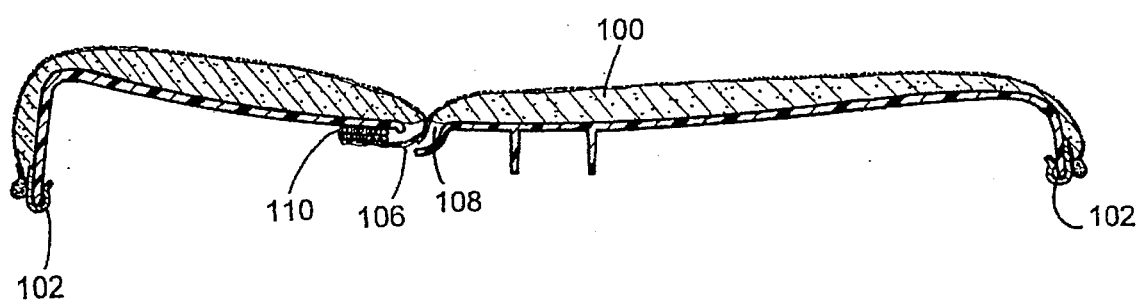
FIG. 16 is a side sectional view showing the clips of the clip-on cushions engaging the edges of the foldable seat.

Another optional upholstering technique which can be used with the invention involves use of a removable upholstered seat cushion 100 and back cushion 101, which are secured to the seat 10 by means of elongate clips 102 having a J-shaped transverse cross section which receive the lower edges of seat member 14 and rearward edges of backrest 16, respectively, a shown in FIG. 15. The seat cushion is also held against the upper seating surface 18 of seat 10 by a pull-down strap 106 which is threaded through a opening 108 located near the center of the seating surface and secured to the bottom of the seat member 14. A preferred means of securing the seat cushion 100 to the bottom of the seat member 14 is by means of a looped fabric strap 106 which is secured to a hook-type fastener 110 secured to the underside of the seat member. The fastener 110 has a large plurality miniature hooks which snag the loops in the fabric strap 106, such as in the well known Velcro™ fastener fabrics.

The opening 108 acts as a drain when seat cushions are not mounted to the seat member 14. The combination drain and strap opening 108 has a wall which curves downwardly and rearwardly from the forward edge of the opening to facilitate easy thread rag and feeding of strap 106 therethrough.

The seat 10 can also be upholstered using various other upholstery techniques, such as with slip-on type cushions.

The seat member 14 and backrest 16 are preferably molded from a relatively strong, rigid, and durable thermoplastic material, with polypropylene being the most preferred material. The resulting seat 10 is strong, durable, and lightweight. The lockbar 63 and lockbar handle 68 are preferably made of an acrylic-butadiene-vinyl aromatic copolymer such as an ABS composition, but can also be made of polypropylene.

It will be understood by those who practice the invention and by those skilled in the art, that various modifications and improvements may be made to the invention without departing from the spirit of the disclosed concept. The scope of protection afforded is to be determined by the claims and by the breadth of interpretation allowed by law.

The embodiments of the invention in which an exclusive property or privilege is claimed are defined as follows:

1. A foldable seat, comprising:
    a seat member having au upper seating surface with a pair of rearward corners, said seat member including a pair of generally upwardly opening elongate slots provided in and located adjacent lateral edges near the rearward corners of said upper seating surface; and
    a backrest having a pair of hingeblades, each of which extends from the backrest and is received within one of said elongate slots, said hingeblades being pivotally connected to said seat member for rotation about a pivot axis located below the sealing surface of the seat member and forward of a rear edge of the seat member, said backrest being pivotable between an upright position and a folded position, said hingeblades projecting through said elongate slots and being substantially wholly received within the interior of the seat member when said backrest is rotated into upright position.

2. The foldable seat of claim 1, wherein said hingeblades have bearing surfaces which engage stop surfaces on said seat member when said backrest is in an upright position, said stop surfaces being located forward of a rear edge of said seat member.

3. The foldable seat of claim 2, wherein said hingeblades occupy substantially all of the space between edges of said slots when the backrest is unfolded into an upright position, whereby insertion of a finger into said slot is restricted to substantially eliminate the risk of a person being pinched between said stops and said bearing surfaces.

4. The foldable seat of claim 2, wherein said bearing surfaces of said hingeblades include forwardly, rearwardly, upwardly, and downwardly facing surface components which engage complimentary stop surfaces on said seat member when said backrest is in an upright position.

5. The foldable seat of claim 4, wherein said bearing surfaces are located to prevent backward rotation of said backrest past its normal upright position in the event of a failure of the pivot connection between the hingeblades and the seat member.

6. The foldable seat of claim 1, wherein the width of said slots is ⅛ inch or less, whereby the risk of inadvertent insertion of a finger into said slot is substantially eliminated.

7. The foldable seat of claim 1, further comprising a locking device for retaining said backrest in a substantially horizontal folded position, said locking device including a lockbar pivotally attached to said seat member for rotation between an unlocked position wherein said lockbar is positioned adjacent to one of said slots to allow said hingeblade to pivot freely within said slot between the folded and unfolded positions and a locked position wherein said lockbar spans across said slot to block rotation of said hingeblade to prevent displacement thereof from the folded position.

8. The foldable seat of claim 7, wherein said slots are located on a pair of sidewings Which project upwardly from opposite lateral edges near rearward corners of said seating surfaces.

9. The foldable seat of claim 8, wherein said slots have vertical, parallel walls which depend downwardly from opposite elongate edges thereof to provide lateral support to said hingeblades.

10. The foldable seat of claim 9, wherein said vertical walls depending from opposite elongate edges of one of said slots include recesses for receiving and allowing rotation of said lockbar between said locked and unlocked positions, said upper seating surface includes a notched out area which overlies one of said recesses, and an aperture in said notched out area which passes through said upper seating surface to said recess which said notched out area overlies, and a handle having a projection which extends through said aperture and is attached to said lockbar, whereby rotation of said handle effects rotation of said lockbar between the locked and unlocked positions.

11. The foldable seat of claim 1, wherein said seat member includes a plurality of tubular bosses on an underside thereof which are used as fastener reinforcements, and an upholstered cushion secured to said seat member by fasteners passing through said tubular bosses on said seat member.

12. The foldable seat of claim 11, wherein said backrest includes a plurality of tubular bosses on a rear side thereof which are used as fastener reinforcements, and an upholstered cushion secured to said backrest by fasteners passing through said tubular bosses on said backrest.

13. The foldable seat of claim 12, further comprising a backrest cover plate secured to the rear side of said backrest by said fasteners passing through said tubular bosses on said backrest, said backrest cover plate providing a work surface when said backrest is in folded position.

14. The foldable seat of claim 1, wherein said backrest includes a plurality of tubular bosses on a rear side thereof which are used as fastener reinforcements, and a backrest cover plate secured to the rear side of said backrest by fasteners passing through said tubular bosses on said backrest.

15. The foldable seat of claim 1, further comprising a seat cushion having elongate clips with a J-shaped transverse cross section, said seat cushion being secured to said seat by said clips which receive lower edges of said seat member.

16. The foldable seat of claim 1, further comprising a back cushion having elongate clips with a J-shaped transverse cross section, said back cushion being secured to said backrest by said clips of said back cushion which receive rearward edges of said backrest.

17. The foldable seat of claim 1, wherein said seat member includes an opening through the seat member and located near the center of said seating surface, said opening having a wall which curves downwardly and rearwardly from a forward edge of the opening to facilitate easy threading and feeding of a hold-down strap attached to a seat cushion, and to allow water to drain from said seating surface.

18. The foldable seat of claim 2, wherein said stop surfaces are resiliently deformable to provide shock absorption to reduce shock loading on a person sitting in said seat.

19. A foldable seat, comprising:
a seat member having an upper seating surface with a pair of rearward corners and having first and second elongate slots provided in and located adjacent lateral edges near the rearward corners of said upper seating surface;

a backrest having first and second hingeblades which project through the first and second slots respectively and into the interior of said seat member; and a pair of pivot pins forming a pivot connection between said hingeblades and said seat member for rotational displacement between a folded position wherein said backrest is in a substantially horizontal position and an unfolded position wherein said backrest is in an upright position;

said hingeblades having a plurality of bearing surfaces, said bearing surfaces including forwardly, rearwardly, upwardly, and downwardly facing surface components which engage complimentary stop surfaces located below said upper surface of said seat member and within the interior of said seat member when said backrest is in an upright position, and which reduce stress and strain on said pivot pins and prevent backward rotation of said backrest beyond the normal upright position even in the event of failure of the pivot connection between the backrest and the seat member.

20. The foldable seat of claim 19, wherein the width of said slots is ⅜ inch or less, whereby the risk of inadvertent insertion of a finger into said slot is substantially eliminated.

21. The foldable seat of claim 19, further comprising a locking device for retaining said backrest in a substantially horizontal folded position, said locking device including a lockbar pivotally attached to said seat member for rotation between an unlocked position wherein said lockbar is positioned adjacent to one of said slots to allow said hingeblade to pivot freely within said slot between the folded and unfolded positions and a locked position wherein said lockbar spans across said slot to block rotation of said hingeblade to prevent displacement thereof from the folded position.

22. The folded seat claim 21, wherein said slots have vertical, parallel walls which depend downwardly from opposite elongate edges thereof to provide lateral support to said hingeblades.

23. The foldable seat of claim 9, wherein said vertical walls depending from opposite elongate edges of one of said slots include recesses for receiving and allowing rotation of said lockbar between said locked and unlocked positions, said upper seating surface includes a notched out area which overlies one of said recesses, and an aperture in said notched out area which passes through said upper seating surface to said recess which said notched out area overlies, and a handle having a projection which extends through said aperture and is attached to said lockbar, whereby rotation of said handle effects rotation of said lockbar between the locked and unlocked positions.

24. A foldable seat, comprising:
a seat member having an upper seating surface with a pair of rearward corners, said seat member including a pair of generally upwardly opening elongate slots provided in and located adjacent lateral edges near the rearward corners of said upper seating surface;

a backrest having a pair of hingeblades, each of which extends from the backrest and is received within one of said slots, said hingeblades being pivotally connected to said seat member for rotation between an upright position and a folded position, said hingeblades projecting through said elongate slots and being substantially wholly received within the interior of the seat member when said backrest is rotated into the upright position; and a locking device for retaining said backrest in a substantially horizontal folded position, said locking device including a lockbar pivotally attached to said seat member for rotation between an unlocked position wherein said lockbar is positioned adjacent to one of said slots to allow said hingeblade to pivot freely within said slot between the folded and unfolded positions and a locked position wherein said lockbar spans across said slot to block rotation of said hingeblade to prevent displacement thereof from the folded position.

25. The foldable seat of claim 24, wherein said slots are located on a pair of sidewings which project upwardly from opposite lateral edges near rearward corners of said seating surfaces.

26. The foldable seat of claim 25, wherein said slots have vertical, parallel walls which depend downwardly from opposite elongate edges thereof to provide lateral support to said hingeblades.

27. The foldable seat of claim 26, wherein said vertical walls depending from opposite elongate edges of one of said slots include recesses for receiving and allowing rotation of said lockbar between said locked and unlocked positions, said upper seating surface includes a notched out area which overlies one of said recesses, and an aperture in said notched out area which passes through said upper seating surface to said recess which said notched out area overlies, and a handle having a projection which extends through said aperture and is attached to said lockbar, whereby rotation of said handle effects rotation of said lockbar between the locked and unlocked positions.

28. The foldable seat of claim 24, wherein said hingeblades have bearing surfaces which engage stop surfaces on said seat member, said stop surfaces being located below said seating surface and forward of a rear edge of said seat member.

* * * * *

UNITED STATES PATENT AND TRADEMARK OFFICE
CERTIFICATE OF CORRECTION

PATENT NO. : 5,658,047
DATED : August 19, 1997
INVENTOR(S) : Ratza et al.

It is certified that error appears in the above-identified patent and that said Letters Patent is hereby corrected as shown below:

Column 2, Line 38;

"tinkers" should be --fingers--.

Column 3, Line 66;

After "backrest" delete --fold--.

Column 6, Line 31;

"5.4" should be --54--.

Column 7, Line 66;

"thread rag" should be --threading--.

Amend B-1, Page 1, Claim 1, Line 2;

"au" should be --an--.

UNITED STATES PATENT AND TRADEMARK OFFICE
CERTIFICATE OF CORRECTION

PATENT NO. : 5,658,047
DATED : August 19, 1997
INVENTOR(S) : Ratza et al.

It is certified that error appears in the above-identified patent and that said Letters Patent is hereby corrected as shown below:

Claim 1, Line 17;

After "into", insert --the--.

Claim 8, Line 2;

"Which" should be --which--.

Claim 8, Line 3;

"comers" should be --corners--.

Claim 23, Line 1;

"Claim 9" should be --Claim 22--.

Signed and Sealed this

Seventeenth Day of February, 1998

Attest:

BRUCE LEHMAN

*Attesting Officer*          *Commissioner of Patents and Trademarks*